(12) United States Patent
Guerbe et al.

(10) Patent No.: US 7,385,388 B2
(45) Date of Patent: Jun. 10, 2008

(54) ENCODER FOR A MOVABLE SHAFT, A DEVICE INCLUDING SUCH AN ENCODER, AND A METHOD OF FABRICATING SUCH AN ENCODER

(75) Inventors: Laurent Guerbe, Segre (FR); Victor Zarife, Cepoy (FR)

(73) Assignee: Hutchinson, Paris (FR)

( * ) Notice: Subject to any disclaimer, the term of this patent is extended or adjusted under 35 U.S.C. 154(b) by 63 days.

(21) Appl. No.: 11/394,379

(22) Filed: Mar. 30, 2006

(65) Prior Publication Data
US 2006/0226830 A1    Oct. 12, 2006

(30) Foreign Application Priority Data
Apr. 11, 2005  (FR) .................................. 05 03562

(51) Int. Cl.
G01P 3/487 (2006.01)
F16C 19/08 (2006.01)

(52) U.S. Cl. ....................... 324/174; 384/448
(58) Field of Classification Search ........... 324/207.11, 324/207.23, 207.25, 173, 174, 178, 179; 73/514.39; 427/127; 384/448
See application file for complete search history.

(56) References Cited

U.S. PATENT DOCUMENTS

| | | | |
|---|---|---|---|
| 5,684,444 A | 11/1997 | Becker et al. | |
| 6,153,327 A * | 11/2000 | Dearnaley et al. | 429/40 |
| 6,309,050 B1 * | 10/2001 | Ikeda et al. | 347/55 |
| 6,815,054 B1 | 11/2004 | Liu et al. | |
| 6,906,509 B2 * | 6/2005 | Tomioka | 324/174 |
| 7,237,960 B2 * | 7/2007 | Oohira et al. | 384/448 |
| 2002/0140418 A1 | 10/2002 | Ichiman | |

FOREIGN PATENT DOCUMENTS

| | | |
|---|---|---|
| EP | 1 517 149 A2 | 3/2005 |
| JP | 200034503 * | 2/2000 |

OTHER PUBLICATIONS

R.P. Howson, The Reactive Sputtering of Oxides and Nitrides, 1994, Pure & Applied Chem., all pages.*
French Preliminary Search Report FR 0503562; report dated Dec. 2, 2005.

* cited by examiner

Primary Examiner—Reena Aurora
Assistant Examiner—Kenneth J Whittington
(74) Attorney, Agent, or Firm—Miller, Matthias & Hull

(57) ABSTRACT

An encoder comprising a sleeve for holding on a shaft and an encoder element secured to the sleeve. The encoder element presents an encoding zone that is protected by a thin layer of material deposited by plasma directly on the encoder element and secured thereto, the thin layer covering at least the encoding zone A device including the encoder and a method of fabricating the encoder are described.

2 Claims, 3 Drawing Sheets

ENCODER FOR A MOVABLE SHAFT, A DEVICE INCLUDING SUCH AN ENCODER, AND A METHOD OF FABRICATING SUCH AN ENCODER

The present invention relates to a displacement encoder for a movable shaft, and more particularly to an encoder comprising a sleeve for being held on the shaft, and an encoder element, in particular an element that is secured to the sleeve, the encoder element presenting an encoding zone provided with at least one polarization mark and protected by protection means.

BACKGROUND OF THE INVENTION

In numerous applications, and in particular for wheel shafts, outlet shafts from gearboxes, or crank shafts of internal combustion engines, a rotary shaft is fitted with a device for encoding angular displacement in order to measure its instantaneous speed of rotation and/or its angular position and/or its direction of rotation.

It is advantageous to make the encoder element using a magnetizable polymer, i.e. a polymer of the elastomer type, or of any other material capable of performing a binder function, and containing a high proportion of magnetic particles, such as ferrite particles, for example. Such magnetizable polymers can be configured in a variety of shapes by molding, and they can be secured to a support by being bonded directly thereto. However, such polymers are relatively friable and their lifetime can be reduced in certain severe applications where the angle encoder is particularly exposed to abrasive particles, such as dust or sand, for example.

Proposals have been made to protect the encoder element by a metal covering part made of non-magnetic metal, which part is mounted on the encoder so as to cover at least the encoding zone, as described in US patent application No. US-A-2002/040418. Nevertheless, the additional covering part needs to be secured firmly to the encoder and increases the complexity and the cost of manufacture. Furthermore, said part needs to present thickness that is relatively large in order to have sufficient strength, thereby increasing the gap between the encoder element and the magnetic sensor, thus degrading the magnetic field emitted towards the sensor, and increasing the overall size of the encoder, given that the magnetizable polymer needs to be relatively bulky in order to generate a magnetic field that is detectable. The presence of a covering part may require the thickness of the magnetizable polymer to be increased as measured perpendicularly to the encoding zone in order to compensate for the disturbance to the magnetic field.

OBJECTS AND SUMMARY OF THE INVENTION

An object of the present invention is to protect the encoding element of the displacement encoder while minimizing the influence of the protection means on the magnetic field generated thereby and on the overall characteristics of the encoder.

To this end, the present invention provides a displacement encoder of the above-specified type, wherein the protection means comprises a thin layer of material deposited by plasma directly on the encoder element and secured to said element, the layer covering at least the encoding zone thereof.

By using plasma deposition, a protective layer is obtained that is bonded sufficiently strongly for it to remain secured to the magnetizable polymer in spite of the mechanical stresses to which the displacement encoder is subjected because of the vibration and the accelerations of the movable shaft. This satisfactory bonding is obtained even when the deposition leads solely to intimate contact between the protective layer and the magnetizable polymer, however it can be further improved by implementing a method of plasma-enhanced chemical vapor deposition (PECVD) that establishes covalent chemical bonds between the material of the protective layer and the magnetizable polymer. The problem of securing the protection means to the encoder element is thus solved.

In addition, the inventors have found that even if the thin protective layer presents intrinsic strength that is much less than that of prior art covering parts, said layer increases very significantly the ability of the surface of the magnetizable polymer to withstand abrasion, thus giving it a long lifetime when the displacement encoder is used in an aggressive environment. Plasma deposition forms a layer that is hard, or at least a layer that presents hardness that is greater than that of the encoder element and most polymers. Depending on the nature of the material that is deposited, the protective layer can also form a barrier against substances that could subject the polymer to chemical attack. Because of its very small thickness, of the order of a few tens to a few hundreds of nanometers, compared with the thickness of a prior art covering element that is of millimeter order, the magnetic fields forming the polarization marks are disturbed very little and the airgap is not increased. The plasma-deposited material may be selected in such a manner that the protective layer is non-magnetic, which, in combination with its small thickness, eliminates practically all effects on magnetic fields.

In preferred embodiments of the invention, recourse is also made to one or more of the following dispositions:
the encoder element is made of a magnetizable polymer, and preferably of elastoferrite;
the protective layer presents a thickness that is greater than 50 nanometers (nm), so as to increase significantly the ability of the surface of the encoder element to withstand abrasion;
the protective layer presents a thickness that is less than 500 nm, so as to ensure that its influence on the magnetic field is practically zero with most kinds of material that can be deposited by plasma;
the protective layer is made of amorphous carbon or of silicon oxides;
the protective layer covers the entire surface of the encoder element and at least a portion of the sleeve;
the protective layer and the magnetizable polymer are chemically bonded together at their interface, so as to increase adhesion between them; and
an annular lip secured to the displacement encoder presents a contact zone for being brought to bear against a stationary casing surrounding the shaft, said contact zone of the lip being free from any plasma-deposited protective layer.

The invention also provides a device comprising a rotary shaft and a displacement encoder, the device comprising a sleeve held in rotation on the shaft, and an encoder element secured to said sleeve, the encoder element presenting an encoding zone that is provided with at least one polarization mark to encode angular displacement, and that is protected by protection means, wherein the protection means comprises a thin layer of material deposited by plasma directly on the encoder element and secured to said element, which layer covers at least said encoding zone.

The device may further comprise a casing filled with liquid into which the rotary shaft penetrates, and in which an annular lip secured to the angle encoder presents a contact zone that comes into sliding contact with the casing, providing sealing between said shaft and said casing, said contact zone and the lip being free from any protective layer deposited by plasma.

The invention also provides a method of fabricating a displacement encoder in which there are provided a sleeve for being held on a movable shaft, and an encoder element secured to the sleeve and presenting an encoding zone, wherein the mutually-secured sleeve and encoder element are placed in an enclosure, and then subjected to deposition of material activated by a cold plasma until a thin protective layer is obtained on at least the encoding zone of the encoder element.

In preferred implementations of the invention, recourse is also had to one or more of the following dispositions:

deposition is performed by an improved chemical vapor deposition (PECVD) method adapted to create covalent chemical bonds between the magnetizable polymer and the deposited material; and the sleeve and the encoder element as provided further present an annular sealing lip presenting a contact zone for being brought to bear against a casing, said contact zone being covered by a mask during the deposition step so as to avoid forming a protective layer on said contact zone.

BRIEF DESCRIPTION OF THE DRAWINGS

Other characteristics and advantages of the invention appear from the following description given by way of non-limiting example and with reference to the accompanying drawings, in which.

MORE DETAILED DESCRIPTION

Figure 1:
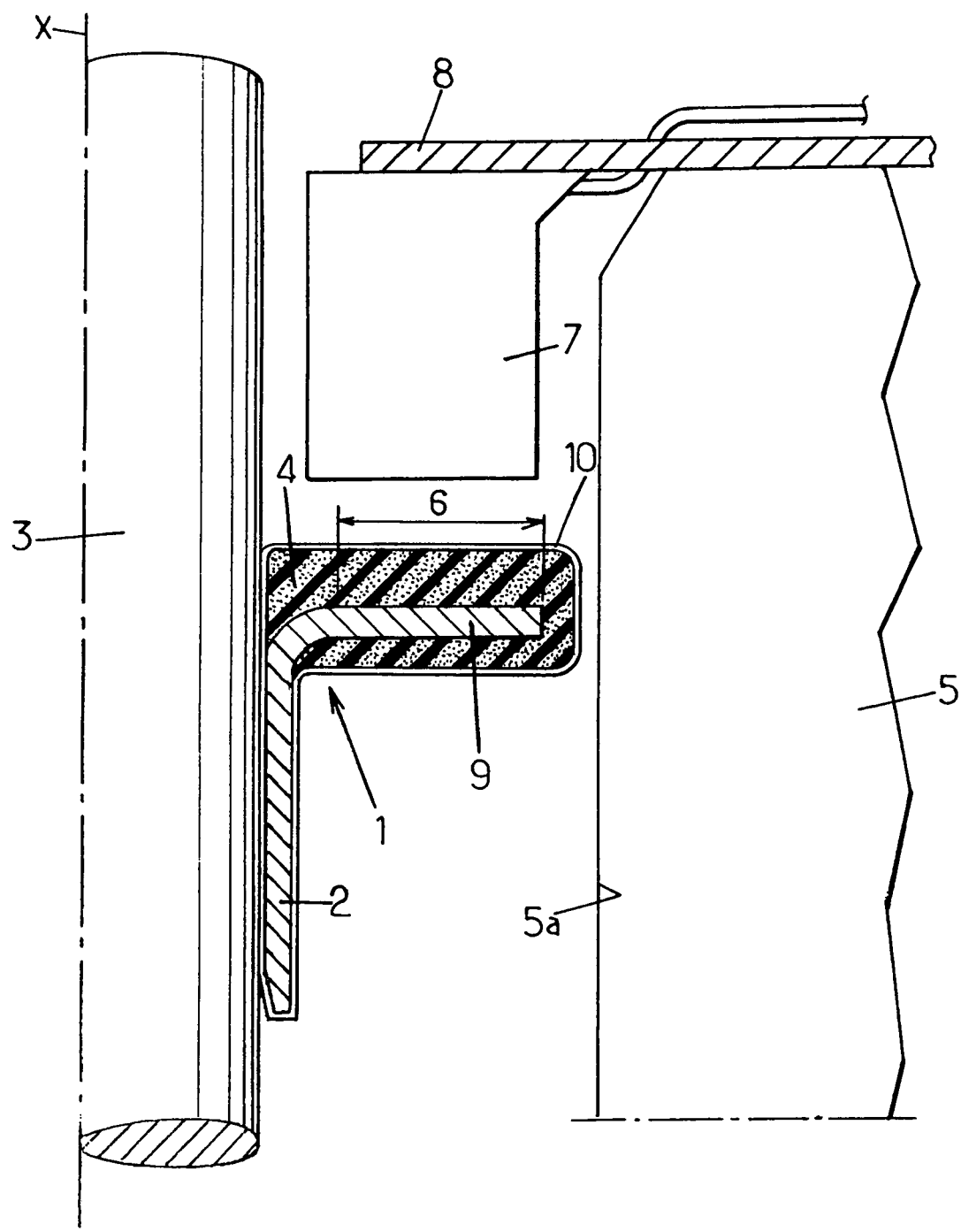
FIG. 1 is a diagrammatic section view of a shaft provided with a displacement encoder in a first embodiment of the invention.

As can be seen in FIG. 1, the angle encoder comprises a sleeve 2 held in rotation on a rotary shaft 3, and an encoder element 4 of magnetizable polymer. Polarization marks are provided in a zone 6 referred to as the encoding zone of the encoder element.

A stationary casing 5 surrounding the angle encoder 1 serves as a stationary base for a sensor 7 secured to the casing via a plate 8.

The rotary shaft 3 may be constituted by any rotary machine shaft, for example a transmission shaft or a wheel shaft. It should be observed that the angle encoder 1 is not necessarily placed on a portion of the shaft that is surrounded by a stationary casing, but could be placed at a distance from any casing or bearing, providing a sensor can be held close to the encoding zone 6. Furthermore, the shaft may be a shaft that performs movement in translation, in which case the encoder serves to determine a linear position and/or speed.

The sleeve 2 is made of metal and is mounted on the rotary shaft 3 as a force-fit. This form of mounting is particularly simple and enables the sleeve 2 to be held in rotation and in translation relative to the shaft 3. However, any other form of mounting could be used, providing that it ensures that the sleeve is held in rotation relative to the shaft. It is also possible to envisage using a sleeve made of a plastics material.

The encoder element 4 is made of elastoferrite, i.e. it comprises a polymer base of the elastomer type acting as a binder, with a high concentration of ferrite particles of magnetic orientation that can be set during vulcanization of the elastomer so as to create polarization marks. Nevertheless, it is possible to use other types of magnetizable polymer. The encoder element may also be a permanent magnet covered in a polymer, e.g. an elastomer. In which case, the elastomer layer, which is generally fine, may also present problems of withstanding abrasion.

In the embodiment shown in FIG. 1, the encoder element 4 is overmolded onto a radial collar 9 of the sleeve 2 and is secured thereto by direct bonding. However, the encoder element could be secured to the sleeve mechanically, or by using an adhesive. The encoder element 4 as made in this way is angular in shape and extends generally in a radial direction relative to the shaft 3.

The polarization marks of the encoding zone 6 are formed by a succession of angular sectors having alternating north and south polarizations, possibly with a sector that is not polarized or a zone that is polarized and that is of greater or smaller extent than the others, in order to determine an absolute angular position for the shaft. The encoding zone 6 thus forms a circular track in this embodiment. Nevertheless, if the angle encoder is used solely for detecting rotation or the direction of rotation of the shaft, the presence of polarization marks all around the sleeve 2 is not necessary, and under such circumstances, the encoder element 4 may be in the form of one or two pellets bonded to the sleeve.

The sensor 7 needs to be adapted to detect magnetic field variation, and for this purpose it is possible, in particular, to use a Hall effect sensor. The sensor 7 is positioned in stationary manner facing the encoding zone 6 that is located at a distance therefrom referred to as the airgap, which distance is small enough to enable magnetic field variations to be detected.

The encoding zone 6 of the encoder element is covered by a protective layer 10. The layer 10 is formed directly on the elastoferrite encoder element 4 by a plasma-activated deposition method that is described in greater detail below. Using a method of this type makes it possible to secure the protective layer 10 on the elastoferrite, in spite of the particularly friable nature of this material. This bonding can be achieved solely by virtue of the protective layer fitting perfectly to the surface of the elastoferrite at atomic level, thereby providing mechanical retention. However the bonding can be further reinforced by using a deposition method and material for the layer 10 that are adapted to establish covalent chemical bonds between the elastoferrite of the encoder element 4 and the protective layer 10. Nevertheless, in both configurations, tests have shown that the layer 10 remains secured to the encoder element 4 under normal conditions of use of the encoder 1, i.e. in the presence of mechanical stresses due to the shaft 3 rotating and in spite of the presence of an aggressive environment.

The layer 10 may be made of an inorganic material, and in particular of silicone oxides ($SiO_x$) or of fluorine oxides. It is also possible for the layer 10 to be made of an organic material, e.g. of amorphous carbon, i.e. an agglomeration of carbon atoms optionally chemically bonded with hydrogen atoms. It is also possible to provide for the layer 10 to include a small proportion of atoms of some other kind in order to improve its characteristics. Silicon oxides and amorphous carbon have the advantage of being capable of being deposited by methods that are thoroughly mastered and of bonding securely to elastoferrite. In addition, with these materials, the protective layer 10 presents hardness that is particularly high.

The layer 10 is a thin layer, i.e. its thickness is much less than the thickness of the elastoferrite layer forming the encoder element 4. In this context, it should be observed that the thickness of the layer 10 as shown in the figures is not to scale relative to the other elements shown, in order to make said layer more visible. The thickness of the layer 10 may lie in the range a few nanometers to several hundreds of nanometers. Consequently, it does not significantly modify the geometrical dimensions of the displacement encoder 1 compared with an unprotected version of the same encoder. The protection provided by the present invention can thus be implemented on an unprotected encoder of the prior art without it being necessary to change the geometrical dimensions of the encoder and without needing to modify the positioning of the magnetic sensor 7, unlike prior protection means having thickness of millimeter order.

The protective layer 10 needs to extend at least over the outside surface of the encoder element 4 that corresponds the encoding zone 6 in order to ensure that the encoding function thereof is preserved over time. Nevertheless, in most circumstances, it is advantageous for the protective layer 10 to cover the entire outside surface of the encoder element 4 in order to avoid any damage to the elastoferrite. The major fraction of the surface of the sleeve 2 is also covered by the protective layer 10, with the exception of certain portions on which the sleeve is supported while plasma-assisted deposition is taking place.

The encoder element 4 as protected in this way by the layer 10 presents resistance to abrasion that is considerably better than that of the same encoder element without protection, and consequently the lifetime of the displacement encoder 1 is significantly extended when it operates in an aggressive environment. This must be due to the increase in the surface hardness of the elastoferrite provided by the plasma-deposited layer, even though the layer does not present intrinsic rigidity comparable to that of the protective elements, such as metal sheets, that are provided in certain prior art devices.

It has been found that a layer 50 presenting thickness of about 50 nm provides the elastoferrite with significant protection against abrasion, while having no detectable influence on the magnetic field created by the encoding zone 6, when the layer is made of silicon oxides or of amorphous carbon. The protection can be increased by increasing the thickness of the layer 10, but it is found that there is no significant further increase in the protection provided for thicknesses in excess of a value of about 500 nm. Furthermore, thicknesses significantly greater than 500 nm could have a detectable effect on the magnetic field.

Figure 2:
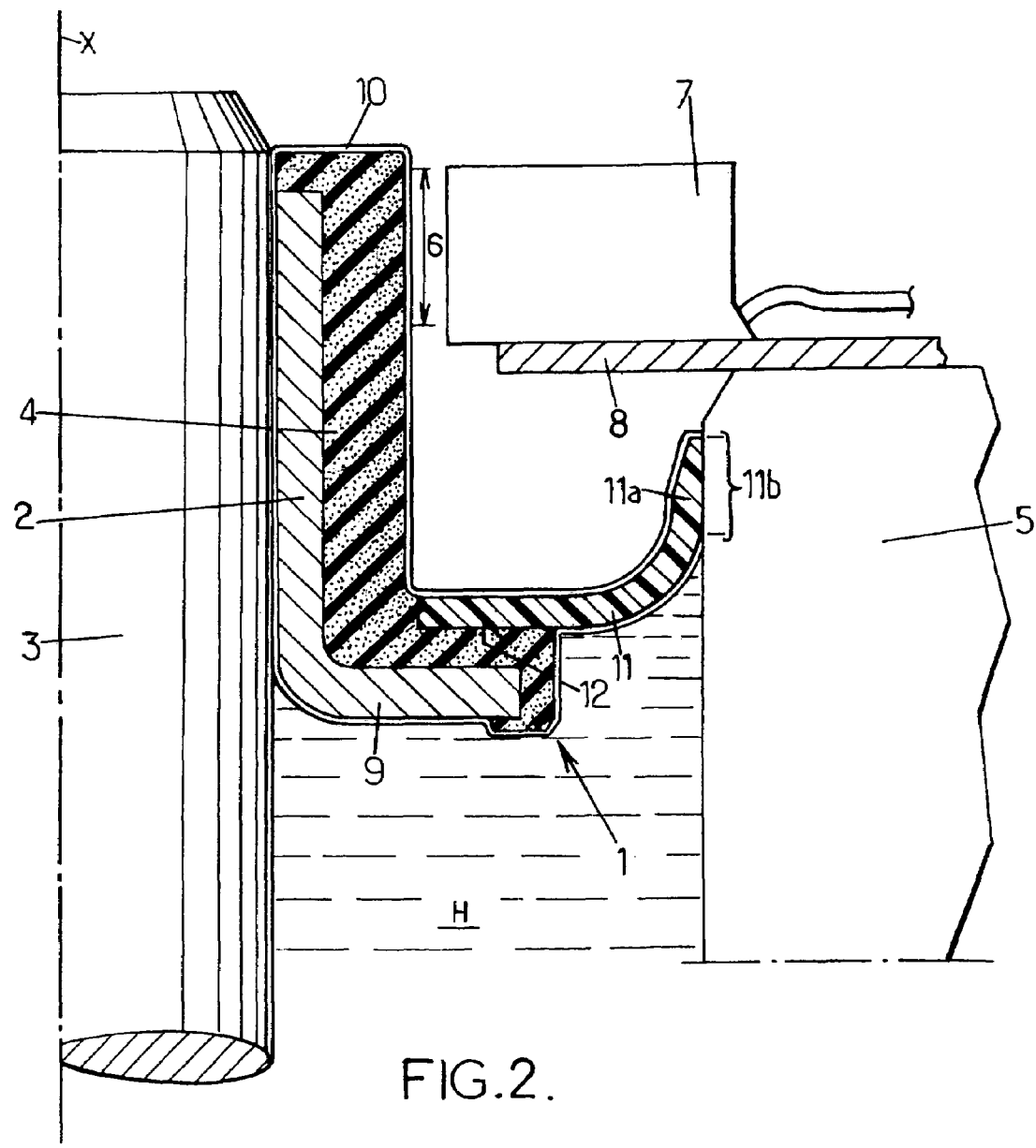
FIG. 2 is a section view analogous to FIG. 1 showing a second embodiment.

FIG. 2 shows a second embodiment of the angle encoder 1 in which the encoding zone 6 of the elastoferrite encoder element 4 is oriented radially outwards, rather than axially as in the embodiment shown in FIG. 1. However the plasma-deposited protective layer 10 may naturally be applied to any encoder element presenting a polymer surface, regardless of its orientation relative to the moving shaft 3 or relative to the sleeve 2. In this second embodiment, the displacement encoder 1 further comprises an annular lip 11 having a base secured to the encoder 1. More particularly, the base of the lip 12 is bonded to an annular surface 12 of the encoder element 4 that extends radially relative to the shaft 3. The end 11a of the lip comes to bear against the stationary casing 5 so as to provide dynamic sealing for a liquid H contained in the casing. Thus, the encoder 1 performs an additional sealing function and can be mounted at the end of the casing of an engine or a gearbox that contains hot oil under pressure, for the purpose of providing dynamic sealing between the shaft 3 and the casing 5. The contact zone 11b between the lip 11 and the casing 5 is not covered by the protective layer 10 so as to conserve the nominal sealing and sliding qualities of said zone. The lip 11 may be made in particular out of polytetrafluoroethylene (PTFE) in order to guarantee sliding with minimum friction against the stationary casing 5. If the contact zone 11b were also covered by the protective layer 10, then it would no longer benefit from the nominal properties of PTFE.

The method of manufacturing the displacement encoder 1 of the invention firstly comprises using a known method to make an encoder without its protective layer 10, i.e. comprising the sleeve 2, the encoder element 4 secured to the sleeve 2 and presenting its final shape after the elastoferrite has been vulcanized, and optionally the sealing lip 11. This assembly, possibly after cleaning treatment applied to the surfaces for covering, is placed in a plasma-assisted deposition enclosure 21 as shown in FIG. 3.

In addition to the enclosure 21, the plasma deposition device 20 has a gas inlet 23, a gas outlet 24, a first electrode 25 connected to an electrical power supply 27, and a second electrode 26.

The electrical power supply 27 is a radiofrequency or microwave source serving to excite the plasma and maintain it in conventional manner using the first electrode 25 to generate radiofrequency or microwave electromagnetic radiation. The inlet 23 serves to introduce various gases into the enclosure 21 depending on the deposition process step and the material from which the protective layer 10 is to be formed. The outlet 24 enables a partial vacuum to be established inside the enclosure.

Figure 3:
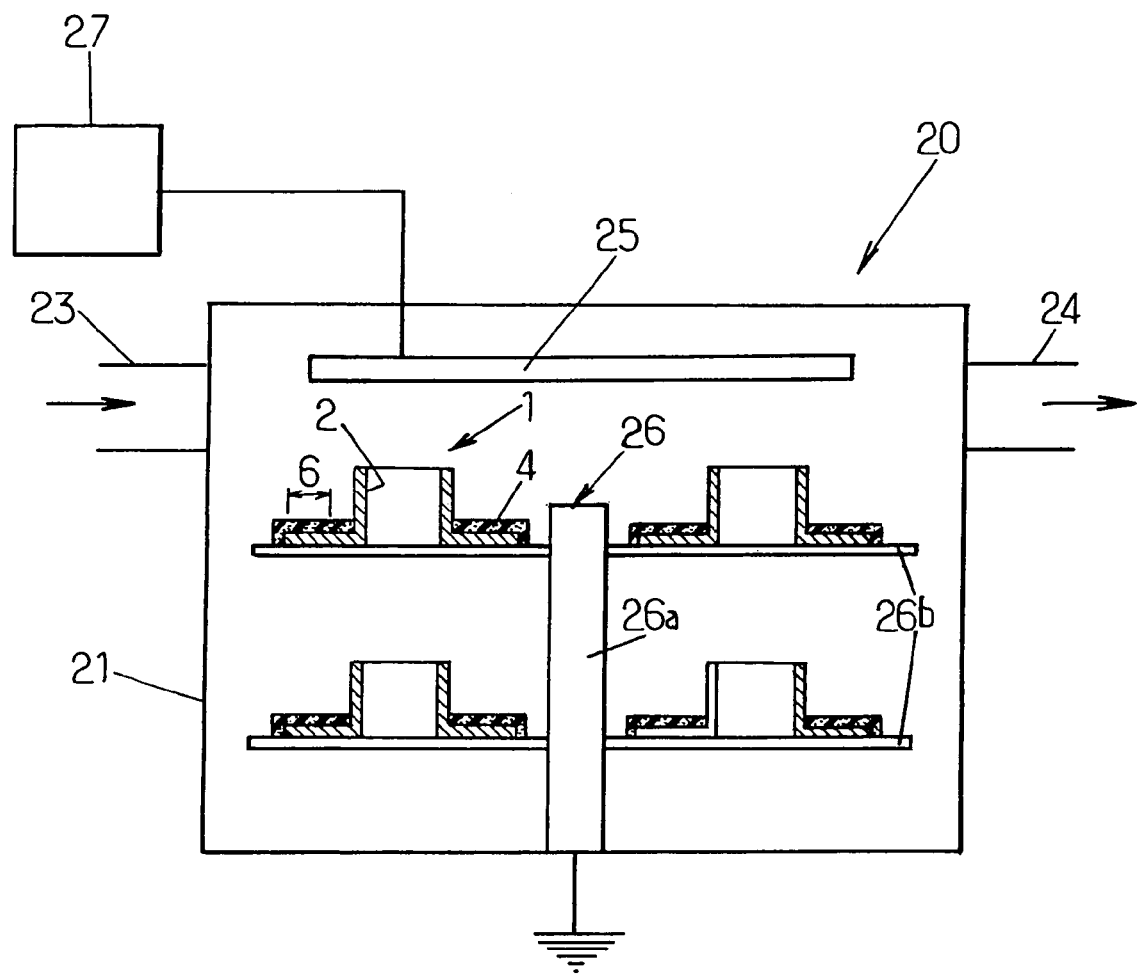
FIG. 3 is a diagram of an enclosure for plasma-enhanced deposition, in which displacement encoders being manufactured are shown in section.

As can be seen in FIG. 3, the second electrode 26 comprises a mast 26a and conductive trays 26b on which the encoders 1 rest. The encoders as deposited in this way are in electrical contact with the second electrode 26 and thus themselves form parts of this electrode, thereby encouraging the plasma to become deposited on the encoders. Naturally, the surface of the encoding zone 6 must be uncovered so that the protective layer is formed effectively thereon. It is entirely possible to provide for an intermediate supports between the trays 26b and the encoders 1 in order to increase the surface areas of the encoders that are covered by the deposit.

If the encoder 1 presents a sealing lip 11, then it is preferable for at least the contact zone 11b thereof to be covered by a mask so as to prevent any deposition taking place in this zone. The encoders 1 are put into place in the enclosure, possibly together with a reagent solution, e.g. a solution of tetramethylsilane in order to deposit $SiO_x$.

Thereafter, a partial vacuum is established in the enclosure and a plasma is generated using the electrical power supply 27 connected to the first electrode 25, the second electrode 26 being connected to ground in the embodiment that is shown diagrammatically. It should be observed that the plasma is a cold plasma, i.e. its temperature does not exceed about 200° C. in order to avoid damaging the encoder element 4 made of magnetizable polymer, and also to avoid reducing the intensities of the magnetic fields created thereby. The plasma, of the radiofrequency type in the implementation described, decomposes the reagent which subsequently forms the deposit.

The deposition step comprises introducing a reagent gas containing compounds of the material from which the protective layer is to be made. For example, in order to make a protective layer of amorphous carbon, methane is introduced.

Deposition takes place for about 1 minute, with the duration of deposition being adjusted as a function of the thickness desired for the protective layer 10.

The operating parameters of the device are determined in such a manner as to perform deposition by PECVD in order to create covalent chemical bonds between the magnetizable polymer of the encoder element 4 and the material being deposited thereon.

Once the deposition stage has been completed, the gas contained in the enclosure is removed and the enclosure is returned to atmospheric pressure. The encoders 1 are then covered in a protective layer 10 and are ready to be used without post-treatment.

Naturally, the parameters of the deposition method described above are not limiting, and any deposition assisted by means of a cold plasma that enables a layer of organic or inorganic material to be formed with an appropriate thickness could be envisaged.

What is claimed is:

1. A method of fabricating a displacement encoder in which there are provided a sleeve for being held on a movable shaft, and an encoder element secured to the sleeve and presenting an encoding zone, wherein said mutually-secured sleeve and encoder element of magnetizable polymer are placed in an enclosure, and then subjected to deposition of material activated by a cold plasma until a thin protective layer is obtained on at least the encoding zone of said encoder element to provide a protection means, and wherein said sleeve and said encoder element as provided further present an annular sealing lip presenting a contact zone for being brought to bear against a casing, said contact zone being covered by a mask during the deposition step so as to avoid forming a protective layer on said contact zone.

2. A method according to claim 1, wherein deposition is performed by an improved chemical vapor deposition method adapted to create covalent chemical bonds between said magnetizable polymer and the deposited material.

* * * * *